United States Patent
Cordes et al.

(10) Patent No.: US 8,585,095 B2
(45) Date of Patent: Nov. 19, 2013

(54) TELESCOPIC TUBE JOINT FOR VACUUM CLEANER SUCTION TUBES OR FOR TRIPODS

(75) Inventors: Martin Cordes, Sundern (DE); Stephan Cordes, Arnsberg (DE); Helmut Schmidt, Salzkotten (DE)

(73) Assignee: fischer Rohrtechnik GmbH, Achern-Fautenbach (DE)

( * ) Notice: Subject to any disclaimer, the term of this patent is extended or adjusted under 35 U.S.C. 154(b) by 407 days.

(21) Appl. No.: 12/520,768

(22) PCT Filed: Dec. 13, 2007

(86) PCT No.: PCT/EP2007/010950
§ 371 (c)(1),
(2), (4) Date: Sep. 21, 2009

(87) PCT Pub. No.: WO2008/077498
PCT Pub. Date: Jul. 3, 2008

(65) Prior Publication Data
US 2010/0072740 A1    Mar. 25, 2010

(30) Foreign Application Priority Data
Dec. 21, 2006 (DE) .......................... 10 2006 061 520

(51) Int. Cl.
*A47L 9/24* (2006.01)
(52) U.S. Cl.
USPC ............... 285/7; 285/303; 285/308; 285/310; 403/109.2

(58) Field of Classification Search
USPC ................ 403/109.1–109.5, 109.7, 109.8; 285/302, 303, 308, 310, 7
See application file for complete search history.

(56) References Cited

U.S. PATENT DOCUMENTS

| 906,135 | A | * | 12/1908 | Hilton | 285/34 |
| 1,071,921 | A | * | 9/1913 | Hilton | 285/34 |
| 2,463,179 | A | * | 3/1949 | Iftiger, Sr. | 285/34 |
| 3,351,359 | A | * | 11/1967 | Ferraris | 285/7 |
| 4,084,829 | A | * | 4/1978 | Falchle et al. | 279/99 |

(Continued)

FOREIGN PATENT DOCUMENTS

| DE | 2 260 816 | 12/1973 |
| DE | 195 47 722 C1 | 1/1997 |

(Continued)

*Primary Examiner* — James Hewitt
*Assistant Examiner* — Jay R Ripley
(74) *Attorney, Agent, or Firm* — Roberts Mlotkowski Safran & Cole, P.C.; David S. Safran

(57) ABSTRACT

A telescopic tube joint (1) is provided for vacuum cleaner suction tubes or for tripods having at least one outer tube (2) and at least one inner tube (3). The tube joint includes a catch recess (5) in the inner tube (3), a catch element (8) on the outer tube (2) which are lockable or unlockable via a manually actuated, rotably movable slider (11) which moves the catch element (8) through an opening (10) in the outer tube (2). The catch recess in the inner tube (3) consists of a tooth strip (6) provided with a plurality of teeth (5), formed on the outer peripheral surface of the inner tube (3). The catch element consists of a short toothed rack (8) having opposing teeth (7), which is pressed into force- and form-fit contact with the toothed strip (6) by the rotary slider (11) in a locked position when turned at a small angle ($\alpha$).

12 Claims, 6 Drawing Sheets

(56) References Cited

U.S. PATENT DOCUMENTS

| | | | |
|---|---|---|---|
| 4,108,202 A * | 8/1978 | Schoepe | 137/436 |
| 4,237,948 A * | 12/1980 | Jones et al. | 411/307 |
| 4,798,358 A * | 1/1989 | Brauning | 248/161 |
| 5,046,761 A * | 9/1991 | Cordes | 285/7 |
| 5,413,445 A * | 5/1995 | Cartellone | 411/400 |
| 5,540,528 A * | 7/1996 | Schmidt et al. | 411/55 |
| 5,692,782 A | 12/1997 | Fischer | |
| 5,836,620 A * | 11/1998 | Wang et al. | 285/7 |
| 6,110,151 A * | 8/2000 | Spool et al. | 604/218 |
| 7,168,128 B2 * | 1/2007 | Evans | 15/414 |
| 2004/0051302 A1 * | 3/2004 | Canale | 285/7 |

FOREIGN PATENT DOCUMENTS

| | | |
|---|---|---|
| DE | 20 2004 000 425 U1 | 5/2004 |
| DE | 20 2005 019 290 U1 | 4/2006 |
| DE | 20 2005 020 121 U1 | 4/2006 |
| DE | 20 2006 019 588 U1 | 4/2007 |
| EP | 1 380 247 A2 | 1/2004 |
| WO | 2004/049891 A1 | 6/2004 |

* cited by examiner

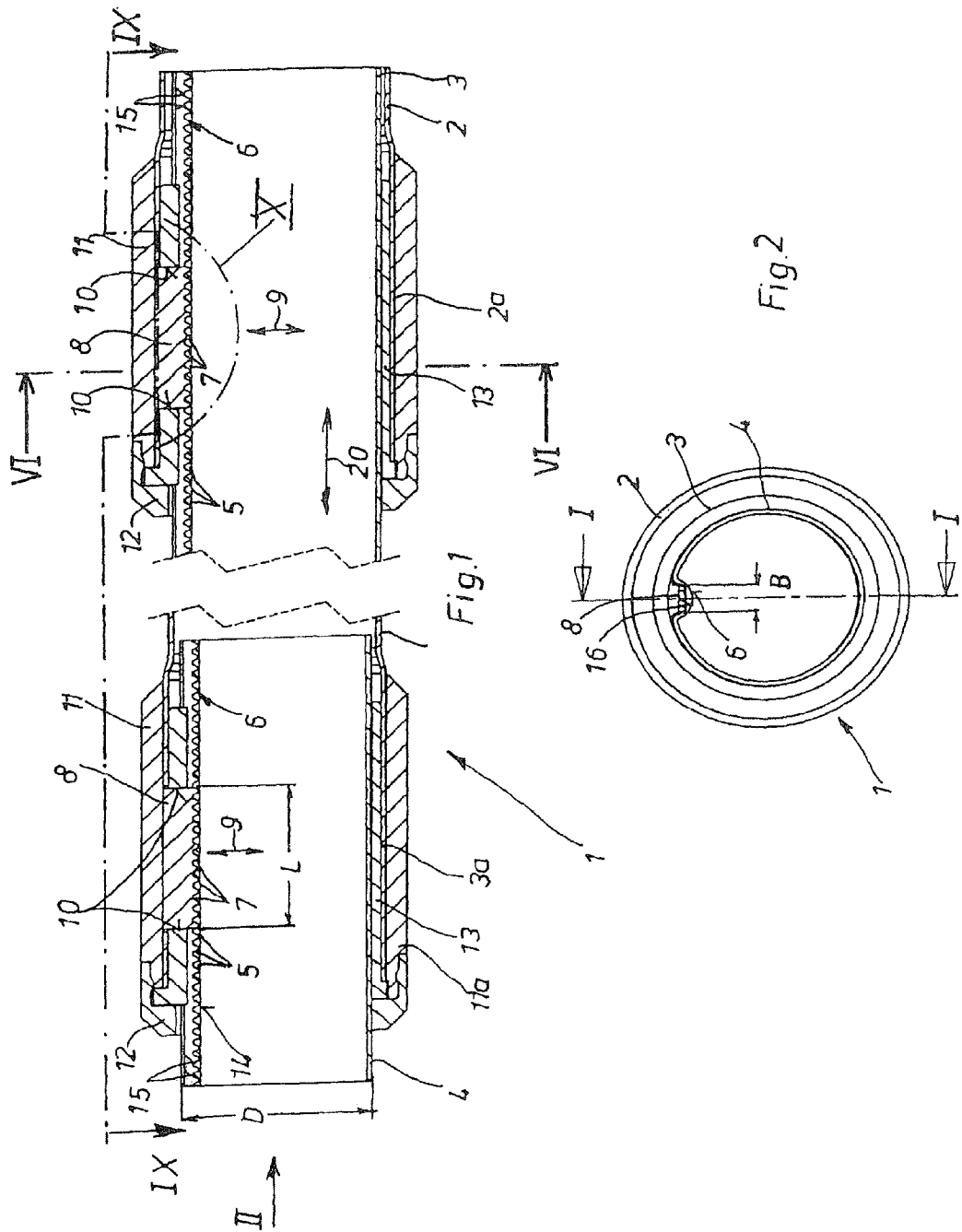

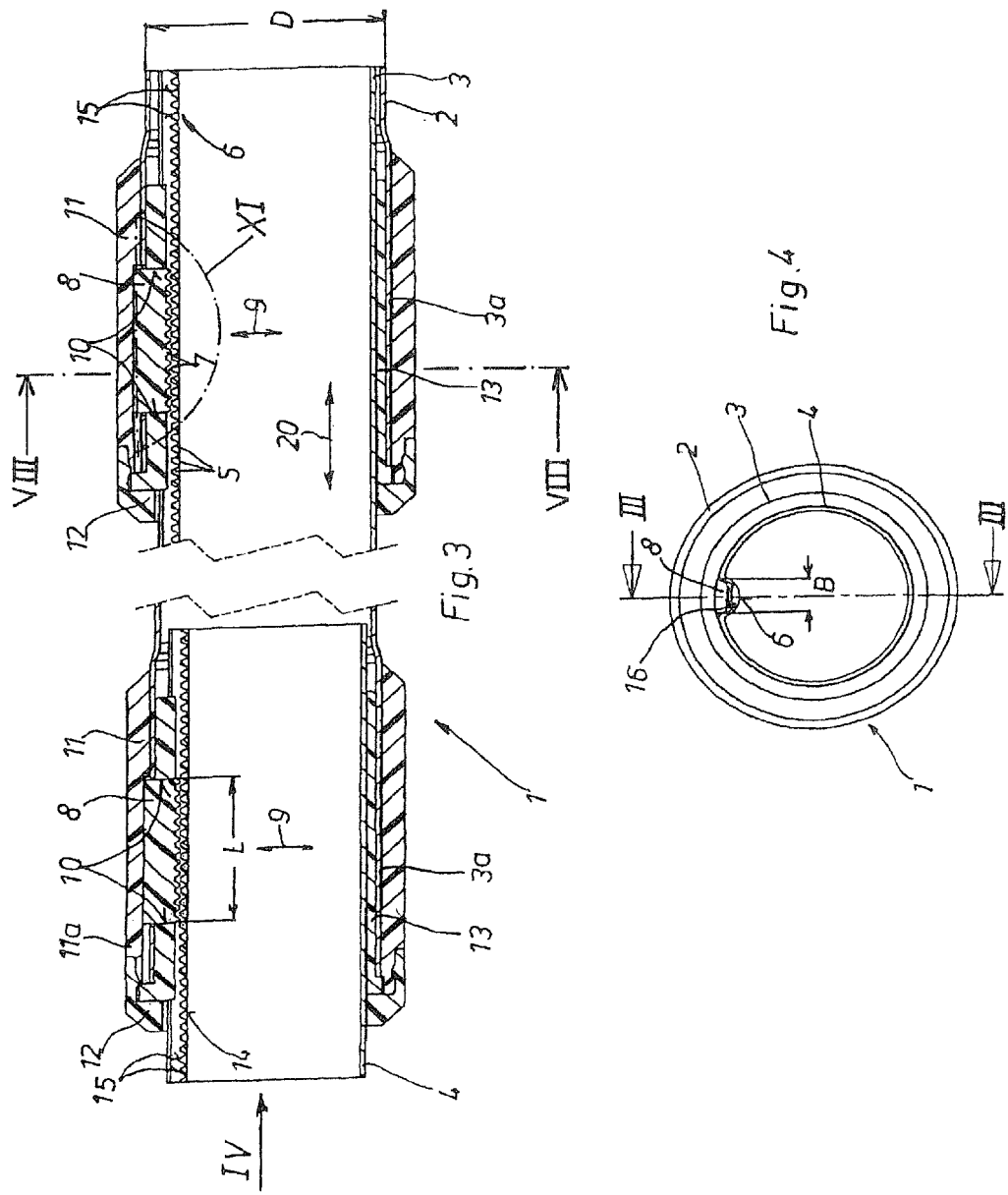

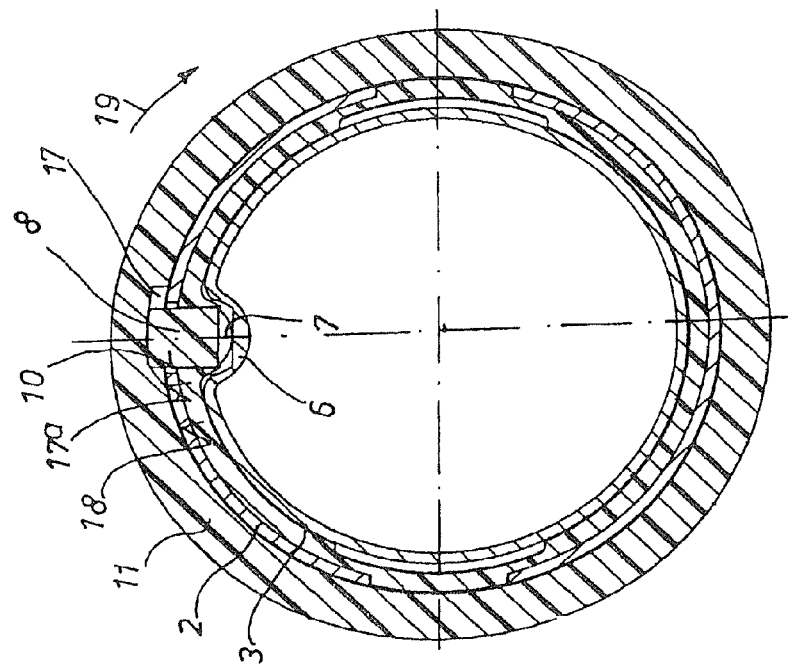
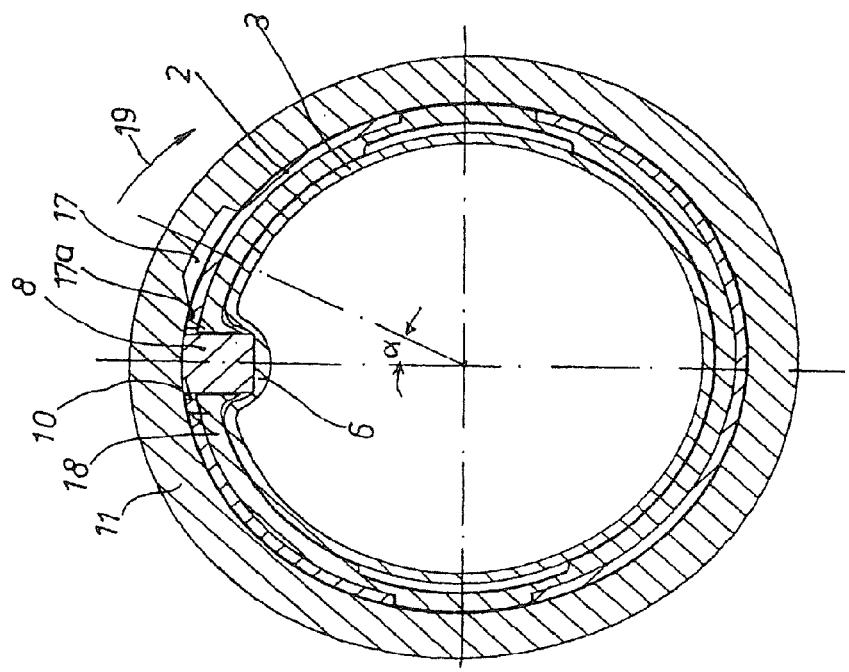

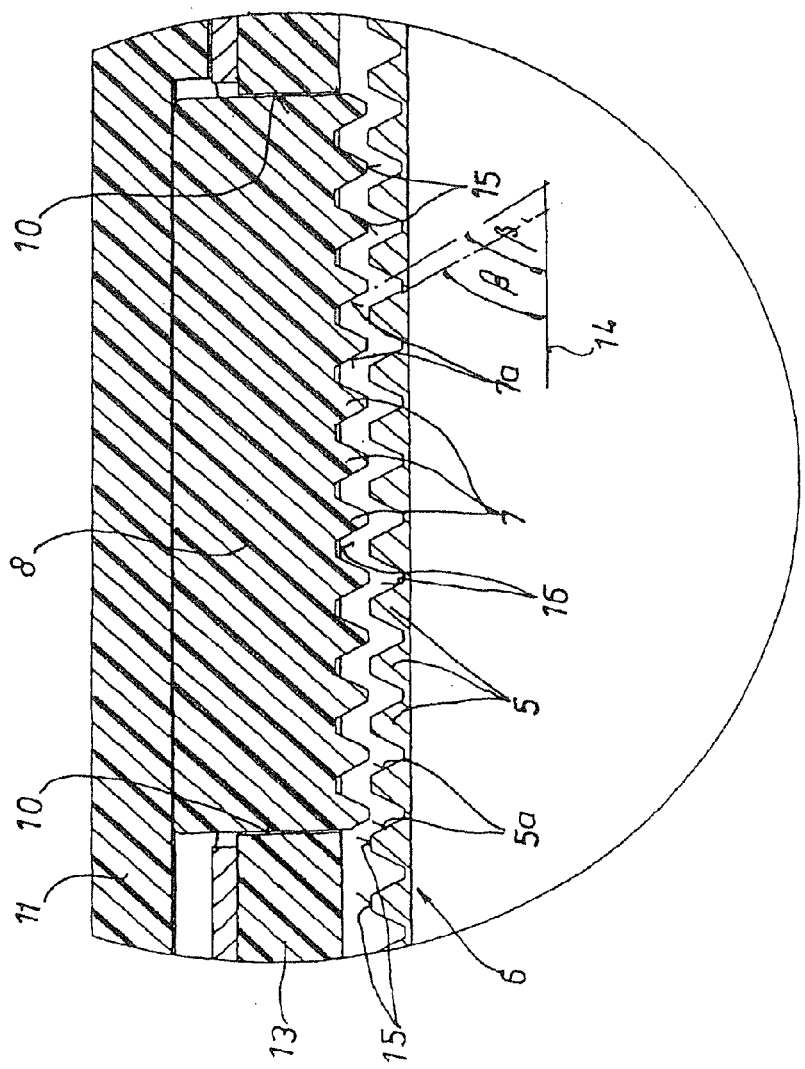

TELESCOPIC TUBE JOINT FOR VACUUM CLEANER SUCTION TUBES OR FOR TRIPODS

BACKGROUND OF THE INVENTION

1. Field of Invention

The invention relates to a telescopic tube joint for vacuum cleaner suction tubes or for tripods having at least one outer tube and at least one inner tube. The tube joint includes catch recesses in the inner tube which couple to a catch element in the outer tube. The catch recesses are lockable or unlockable with the catch element via a manually actuated rotary slider attached to and slidably movable around the outer tube.

2. Description of Related Art

In a telescopic tube joint for vacuum cleaner suction tubes according to DE 195 28 814 C1 and DE 195 47 722 C1, the catch element consists of two slidable clamp bodies. The clamp bodies are at opposing acute angles opposite the longitudinal axis of the outer tube on a slanted glide plane of a guide body inserted and form-fitted in a recess of the outer tube engaging in separate catch recesses. The clamp body blocking the respective relative movement of the inner to outer tube is slidable or, in order to release this locked position, is slidable out of its catch recess along its slanted glide plane via the linearly moveable slider. Both clamp bodies are under the influence of a spring, which serves the purpose of keeping both clamp bodies in their locked position. The catch recesses consist of ducts on the outer peripheral surface running diagonally to the longitudinal axis of the tube having a calotte-shaped cross-section, in which the correspondingly rounded clamp bodies are engaged. This telescopic tube joint has proven reliable for vacuum suction tubes. In order to use such a telescopic tube joint not only for vacuum cleaners, but also for tripods, the relatively large space between the catch recesses in the inner tube, on the one hand, as well as the multitude of parts have been perceived to be disadvantageous. In particular, the shortest telescope path is determined by the relatively large space between two catch recesses.

In addition, there is a multitude of different telescopic tube joints in the prior art for tripods, which lock the tubes using spring-loaded latch pins that engage through an opening of the inner tube in a row of holes in the outer tube. Here, the shortest telescope path is determined by the distance of the openings in the outer tube.

In addition, there is a series of telescopic tube joints for tripods that are locked with a force-fit toggle connection. For this purpose, a lever is switched at the respective variably achievable position, which pushes the tubes having a square cross-section force-fit against one another in their locking position. This telescopic tube joint has the considerable disadvantage that only such a force can be exerted, which does not exceed the clamping force of both tubes. When an impelling force is exerted on one or both ends, these tubes tend to slide into one another because the purely force-fit connection is not able to withstand such forces.

In particular for tripods and also for vacuum cleaner suction tubes, tube joints are additionally known that can be continuously adjusted, but are clamped together under frictional force into the respective position using a rotary slide. Unfortunately, the tubes of such joints can slide into one another under an impelling force exerted on one or both ends because this force-fit connection can also not be maintained by the clamping force.

SUMMARY OF THE INVENTION

The object of the present invention is to improve a telescopic tube joint of the like for a vacuum cleaner suction tube as well as for tripods in such a manner that a virtually infinitely variable telescopic tube is guaranteed and that, using inexpensive and simple production and assembly, force-fit as well as form-fit locking of the tubes into their locked position is ensured but can simultaneously be released with just a turn of the hand.

This object is met according to the invention in connection with the generic term mentioned above, by means of a tube joint that includes a catch recess in the inner tube including a tooth strip provided with a plurality of teeth imprinted or stamped on the outer peripheral surface of the inner tube, a catch element including a short toothed rack having opposing teeth, and a rotary slide. The short toothed rack may be pressed into force- and form-fit contact with the toothed strip by the rotary slide in a locked position. The pressing force on the short toothed rack can be relieved by means of a slight turn of the slide under exertion of the force of the operator, which allows the tubes to be slid relative to one another as a result of the toothed strip moving into a rebound on an inner peripheral area of the rotary slide. The sliding force of the operator causes the tooth profiles of the teeth of the toothed strip to push the tooth profiles of the opposing teeth in the toothed rack upwards into the rebound as a result of a wedge-shape in the teeth. The opposing teeth of the toothed rack "hobble" over the teeth of the toothed strip until the desired telescope expansion or insertion length has been achieved.

Now, the smallest telescopic path is defined by the distance between two teeth, whereby, due to the formation of the teeth being small in area and their corresponding multitude, a virtually infinitely variable telescopic tube joint is achieved, whose steps are now determined by the tooth spaces of the relatively small teeth. Additionally, this tube joint consists of just three parts, namely a toothed strip on the outer periphery of the inner tube, the short toothed rack and the rotary slide. A spring, onto which multiple clamping elements are positioned on a slanted plane, is not necessary. Advantageously this telescopic tube joint is not only locked force-fit together, but also form-fit in the locked position, from which it cannot be released by impelling forces on the tube ends because all—and not just one tooth of the toothed strip having the same number of opposing teeth as the toothed rack determines the locking force. Assembly is simple and production economic.

In addition, this telescopic tube joint allows for a sequence of multiple and not just two tubes, which is essential, in particular for tripods, and less so for vacuum cleaner suction tubes. In order to create a telescopic tube joint having three tubes, for example, on an cross-section expanded end of the inner tube that is averted to the respective outer tube, a second rotary slide is advantageous arranged on the inner tube now acting as outer tube, which interacts with one second inner tube sliding in the first inner tube and having a second toothed strip and a second toothed rack. The effect is that the diameters of the tubes are scaled down increasingly from the first outer tube to the last inner tube, which, however, naturally, carry a larger load because they are not purely force-fit, but are always immovably form-fit in their locked position. There is also an overall pleasant appearance because the rotary slide and the tubes conform, though not in their outer diameter, but rather in their circular form.

An advantage is the teeth in the toothed strip and the toothed rack being of the same size, which leads not only to a clamping area of corresponding size, but also forms a form-fit corresponding contact surface.

Here, the teeth in the toothed strip and in the toothed rack have straight toothing, where the teeth gripping one another achieve a large as possible contact surface. The teeth are provided with even profiles for further development of this use, which run at an angle β to the horizontal of between 30° and 90°, preferably between 60° and 90°. An angle β between 60° and 90° has proven reliable in the first test models of the telescopic tube joint because such an angle, on the one hand, results in a small telescopic path from tooth to tooth due to its steepness and, on the other hand, also ensures a sufficient locking force under exertion of impelling forces on the tube ends. Thus, the steepness of the profile angle β together with the number of teeth determines the smallest telescopic path in the tube joint according to the invention.

In order to achieve a robust and wear-resistant form, the tooth profiles on the crest of the teeth are connected to one another via a radial rounding or an even flattening. Additionally advantageous are the opposing teeth being rounded convexly over the width of the toothed rack on their free ends and the tooth spaces in the toothed strip being concavely rounded over their width. Thereby, the toothed rack having convex rounding grips the crest of its opposing teeth in the concavely rounded tooth spaces in the toothed strip, which ensures a low-friction gripping in and out of the teeth with the opposing teeth.

The rotary slide has an advantageous cylindrical outer form, which encompasses the tube acting as outer tube in a space-saving manner.

According to a particularly advantageous further development of the invention, each rotary slide is provided with a recess on it inner peripheral surface, which corresponds to the width and length of the toothed strip extending into the opening position of the tube joint and is provided on at least one side of the recess with a continuously narrowing inner peripheral surface, which, in the locked position achieved by turning the rotary slide, presses the toothed rack with its teeth into the bases between the teeth of the toothed strip. Since, in order to achieve this pressed position only a small angle of, for example, 15° based on the opening position is required, a change in the pulled-out position of the telescope tube can be achieved quite quickly.

The toothed rack is mounted in a form-fit manner in the respective outer tube. For this purpose, the toothed rack has a rectangular shape in the vertical positional view, which reaches with slight tolerance through a square opening of the same size in the outer tube.

According to a particularly advantageous further development of the invention, all tubes are made of aluminum, while the rotary slide and the toothed rack advantageously consist of polyamide. Aluminum is lighter than stainless steel and allows for a more precise imprint even with the smallest of teeth for a toothed strip, which is quite difficult with stainless steel. In order to produce a precise form of the teeth on the toothed rack, polyamide has proven to be the most convenient due to its wear resistance. The rotary slide with its clip-on front ring as well as a sealing and guiding sleeve can also be made of POM or PE.

The tubes are advantageous when provided with a wall thickness of 0.8 mm and an outer diameter of between 32 mm and 38 mm.

An embodiment of the invention is shown in the drawings. They show

BRIEF DESCRIPTION OF THE DRAWINGS

FIG. 1 is a longitudinal section through a total of three telescopic tubes in their locked position, in which the background lines have been left away for a better view, along line I/I from FIG. 2

FIG. 2 is a view in the direction of the arrow II from FIG. 1,

FIG. 3 is a sectional view along line III/III from FIG. 4 in the unlocked position of the toothed rack and the toothed strip, FIG. 4 is a view in the direction of arrow IV from FIG. 3, FIG. 5 is a sectional view along line VI/VI from FIG.5 in the locked postion, FIG. 6, is a sectional view along line VIII/VIII from FIG.7, FIG.9 is an enlarges view of detail XI in FIG.3.

DETAILED DESCRIPTION OF THE INVENTION

Figure 7:
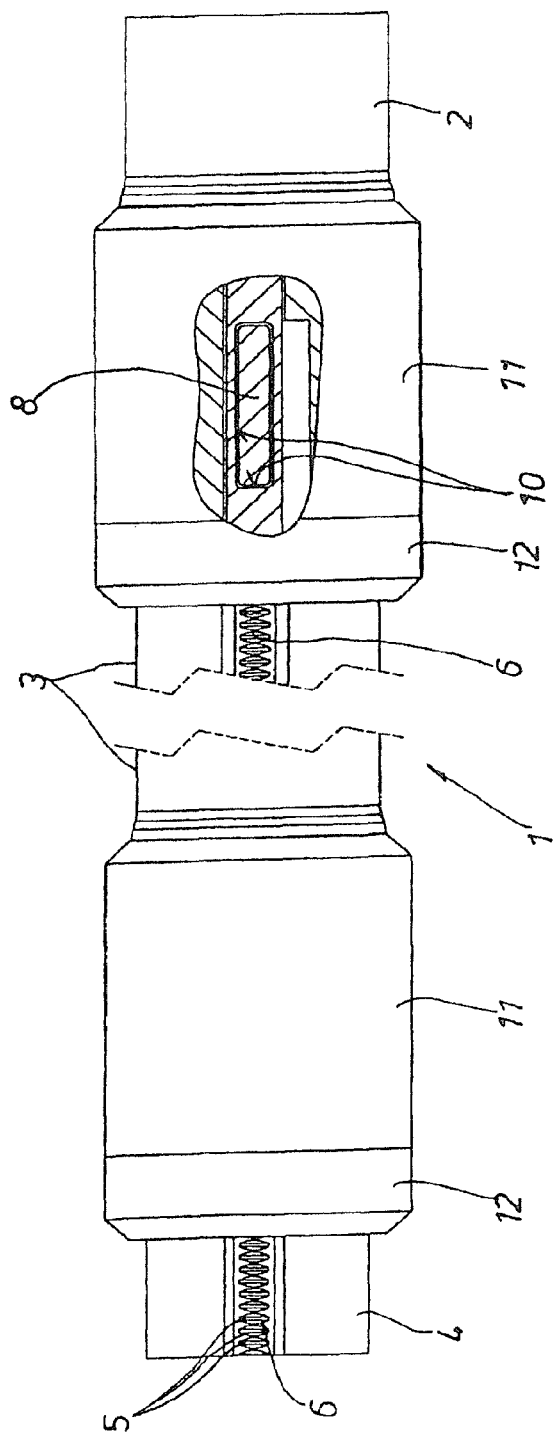
FIG. 7 is a top view of the vacuum cleaner suction tube along line IX/IX from FIG. 1.

The telescopic tube joint 1 according to FIGS. 1 to 4 comprises an outer tube 2, a first inner tube 3 slidable therein and a second inner tube 4, which telescopes into the first inner tube 3. In reference to the second inner tube 4, the first inner tube 3, thus forms an outer tube. For this reason, it is stated in the generic terms of claim 1, that the tube joint has at least one outer tube and at least one inner tube. However, to avoid confusion in the following description, the terms "outer tube 2", "first inner tube 3" and "second inner tube 4" shall be maintained.

The first inner tube 3 and the second inner tube 4 are provided with a plurality of teeth 5 in the form of an imprinted or, respectively, stamped toothed strip 6 on their peripheral surface. The toothed strip 6 is thus integrally joined with the respective inner tube. The gaps between the teeth 5 provide catch recesses which grip into a plurality of opposing teeth 7, which are part of a short, toothed rack 8 which provides a catch element. This toothed rack 8 according to FIGS. 1 and 3 can be slidably moved through an opening in the outer tube 2 in the direction of the double arrows 9 for locking and unlocking. The peripheral configuration of the toothed rack 8 and the opening 10 are similar in geometry and have clearance so that the toothed rack 8 can be slid into and out of the opening 10 without being canted (see FIG. 9). As seen from FIG. 9, the peripheral configuration of the toothed rack 8 and the opening 10 are presently formed as a rectangle with slightly rounded corners.

The toothed rack 8 is arranged on an extended end section 2a of the outer tube 2 and is encompassed by the rotary slide 11. At the end 11a of the rotary slide 11, finally, a front ring 12 is snapped on, which keeps the rotary slide 11 in its intended turned position. A sealing sleeve 13 is arranged between the inner periphery of the extended end section 2a of the outer tube 2 and the outer periphery of the first inner tube 3. This sealing sleeve 13 can also be called a guiding sleeve, since on the one hand; it extensively seals the space between the outer periphery of the first inner tube 3 and the inner periphery of the outer tube 2, which is important for the use of this telescopic tube joint as a vacuum cleaner suction tube. On the other hand, the sealing sleeve 13 acts, in reference to the telescopic ability of both tubes 2, 3, as a guiding sleeve 13 in order to guide the respective inner tube 3 or 4 freely in the outer tube 2 or 3, which is particularly important for the use of this telescopic tube joint 1 in tripods.

Similarly, a further rotary slide 11 having a front ring 12 and a further sealing or, respectively guiding sleeve 13 is arranged in an expanded area 3a of the first inner tube 3.

As can be clearly seen in FIGS. 1 and 10, the gaps between the teeth 5 of the toothed strip 6 of the respective inner tube 3 or 4 engage into the opposing teeth 7 of the toothed rack 8 in the locked position shown there.

The teeth 5 of the toothed strip 6 and the opposing teeth 7 in the toothed rack 8 are about the same size. Furthermore, the teeth 5, 7 are provided with straight teeth in the toothed strip 6 and the toothed rack 8, i.e. the teeth 5 and the teeth 7 run in a straight line. Furthermore, the teeth are provided with even profiles 5a, 7a that run along a horizontal 14 at an angle α between 30° and 90°, in the present case according to FIGS. 10 and 11 at 60°. The tooth profiles 5a, 7a are connected to one another at the crest 15 of the teeth 5, 7 via a radial rounding or an even flattening.

As can be seen most clearly from FIGS. 2 and 4, the teeth 5, 7 over the width B on the toothed rack 8 or, respectively the toothed strip 6 are rounded convexly on their free ends and the bases 16 of the teeth 5 in the toothed strip 6 over their width B are rounded concavely. This is not a contradiction to the above features that the profiles 5a and 7a on the crests of the teeth 5, 7 are connected to one another via a radial rounding or, respectively flattening, since this connection runs axially as opposed to the rounding of the teeth 5, 7 in a manner as described in FIGS. 2 and 4 running in a radial direction.

As can be learned from FIGS. 1, 3, and 7, the rotary slide 11 has a cylindrical outer periphery form, which is tapered or, respectively, rounded on both ends in a favorable form.

As can be most clearly seen in FIGS. 5 and 6, the rotary slide 11 is provided with a recess 17 in an area of its inner peripheral surface, which corresponds to the width B and the length L of the toothed rack 8 extending into it in the unlocked positition. In an oval or elliptical formation of the toothed rack 8 and the opening 10, the main axis and the auxiliary axis of the ellipses are approximately in the same plane and are approximately the same length considering a slight tolerance.

As can be most clearly seen in FIG. 5, a continuously narrowing inner peripheral area 17a runs along at least one side, presently along the left side of the recess 17 of the rotary slide 11, which presses the toothed rack 8 with its teeth 7 into the bases 16 between the teeth 5 of the toothed strip 6 to achieve the locked position and by turning the rotary slide 11 in the direction of the arrow 19. The locked position shown in FIGS. 1 and 2 as well as in FIG. 5 is, thus, achieved. In this locked position, the outer tube 2 and the first inner tube 3 can no longer be slid relative to one another. The same goes for the first inner tube 3 acting as an outer tube in respect to the second inner tube 4. Both of these tubes are shown in their locked positions in FIGS. 1, 2, and 5.

Figure 8:
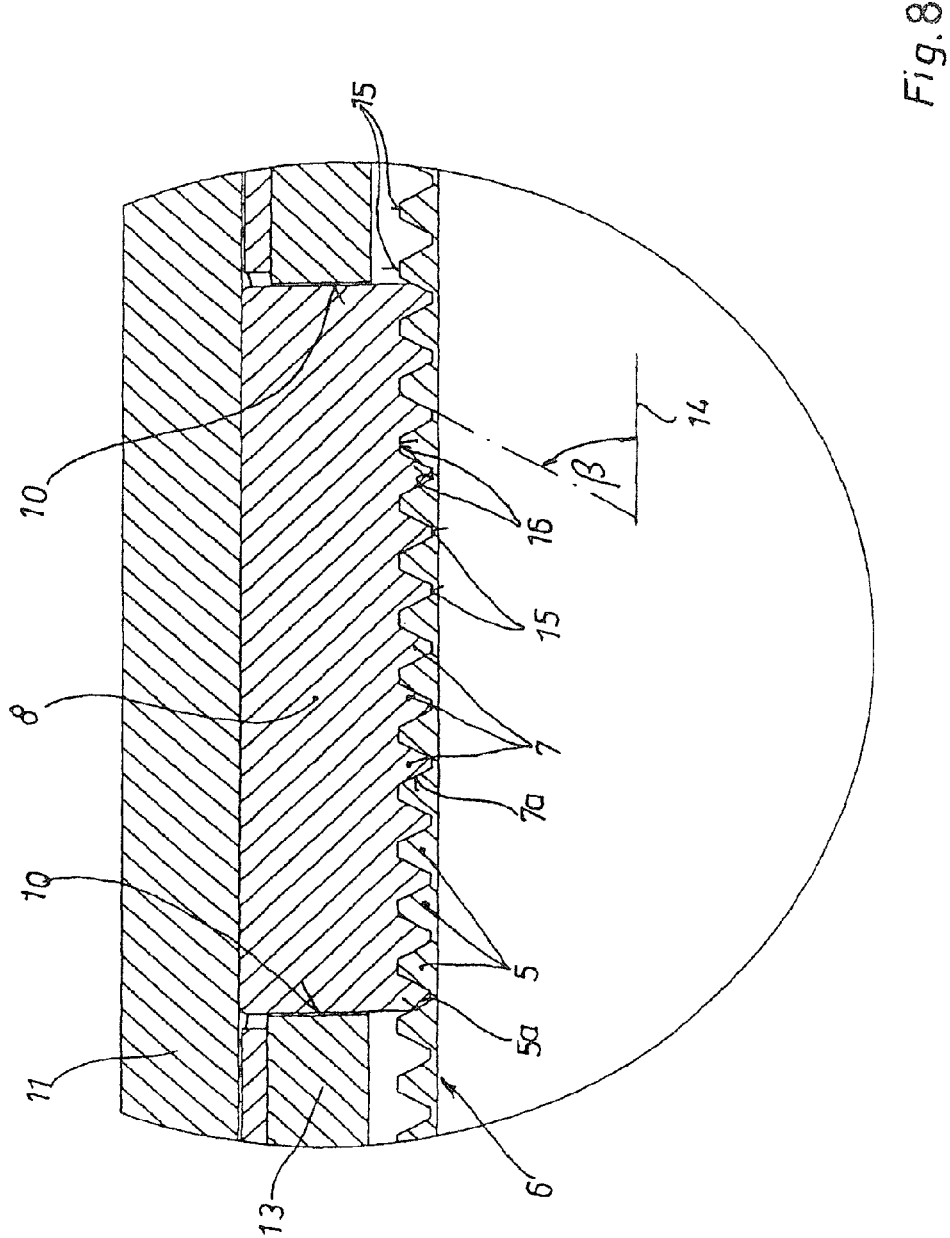
FIG. 8 is an enlarge view of detail X in FIG. 1.

In order to go from the unlocked position according to FIG. 8 to the locked position according to FIG. 6, the rotary slide 6 only has to be turned clockwise to a minimal angle α in the direction of the arrow 19. As soon as the inner peripheral suface 18 of the rotary slide 11 produces the locked position of the toothed rack 8 according to FIG. 6, the locked position is achieved. For unlocking, the rotary slide 11 is turned counter-clockwise or, respectively, in the opposite direction of the arrow 19 from the position in FIG. 6 to the position in FIG. 8, to the left, in the drawings, until the toothed rack 8 can switch back into the recess 17.

In the unlocked position of FIGS. 3, 4, and 6, the outer tube 8 can be slid in both directions of the double arrow 20 relative to the first inner tube 3. The sliding force of the operator causes the tooth profiles 5a of the teeth 5 of the toothed strip 6 to push the tooth profiles 7a of the opposing teeth 7 in the toothed rack 8 upwards in a wedge shape having an angle β of, for example 60°. The opposing teeth 7 of the toothed rack 8 "hobble" over the teeth 5 of the toothed strip 6 until the desired telescope expansion or insertion length has been achieved. Then, one turn to an angle α of the rotary slide 11 according to FIG. 6 in the direction of the arrow 9 is needed to achieve the locked position according to FIG. 5. Since the angle α is only very small, presently between 10° and 20°, the locking position is achieved within seconds with just one turn of the hand.

As is clearly shown in the enlarge views of FIGS. 8 and 9, the profiles 5a in the toothed strip 6 as well as the profiles 7a of the opposing teeth 7 in the toothed rack 8 are formed straight, i.e. they run in a plane. This plane of the tooth profiles 5a, 7a runs at an angle β along a horizontal 14 as is sketched in FIGS. 8 and 9. Both the teeth 5 in the toothed strip 6 and the opposing teeth 7 in the toothed rack 8 are provided with flat areas on their crests 15, which engage in the corresponding flat areas in the tooth bases 16. The form of the tooth crests 15 as well as the tooth bases 16 prevents damage to the to the teeth during the telescope process, when, for example, the opposing teeth 7 of the toothed rack 8 "hobble" over the teeth 5 of the toothed strip 6 during the sliding process.

The tubes 2, 3 and 4 are advantageously produced of aluminum, wherein the rotary slide 11 with its front ring 12 as well as the sealing or, respectively, guiding sleeve 13 and the toothed rack all consist of polyamide. For the rotary slide 11 and for the front ring 12 as well as the sealing or, respectively, guiding sleeve 13, POM and PE could be used. Here, the sealing or, respectively, guiding sleeve 13 simultaneously forms, in respect to the expanding area 2a of the outer tube 2, a strengthening corset in this end area. The tubes 2, 3, 4 have different diameters: thus, for example, the second inner tube 4 can have an outer diameter of 32 mm, the first inner tube 3 an outer diameter of 35 mm and the outer tube 2 an outer diameter of 38 mm. The wall thickness of the tubes can measure 0.8 mm. Such a thickness is completely sufficient for imprinting a stable toothed strip 6 into the respective inner tube 3, 4.

What is claimed is:

1. A telescopic tube joint for vacuum cleaner suction tubes and tripods, comprising:
   at least one outer tube and at least one inner tube,
   a catch recess in the at least one inner tube;
   a catch element in the at least one outer tube, and
   a rotary slide that locks and unlocks engagement of the catch recess with the catch element and which includes a recess in an inner peripheral area for receiving the catch element,
   wherein the catch recesses in the at least one inner tube include a tooth strip provided with a plurality of teeth disposed on an outer peripheral surface of the at least one inner tube and the catch element includes a short toothed rack having upwardly oriented opposing teeth and
   wherein the rotary slide pushes the toothed rack out of said rotary slide recess into force- and form-fit contact with the toothed strip in a locked position when turned at an angle (α), and wherein the toothed rack can be pushed back into said rotary slide recess into an unlocked position when said rotary slide is located turned back by said angle (α) such that said at least one inner and outer tubes may be moved relative to one another,
   wherein, when said rotary slide is located turned back by said angle (α), an axial sliding force is applied to the outer tube in a manner causing a surface of teeth of the toothed strip to push against a surface of opposing teeth of the toothed rack so as to move the toothed rack upwards at an angle (β) and into said rotary slide recess to obtain the unlocked position in which opposing teeth of the toothed rack hobble over the teeth of the toothed strip until the desired telescope expansion or insertion length has been achieved,
   wherein the toothed rack has a substantially rectangular shape (a width of B and a length of L) in the vertical positional view, which reaches with tolerance through a substantially rectangular opening of essentially the same size in the outer tube which defines said slide recess, wherein each rotary slide is provided with a said slide recess on its inner peripheral surface, which corresponds to the width B and length L of the toothed rack extending into the opening position, and is provided on at least one side of the slide recess with a continuously narrowing radial height which, to reach the locked position and by turning the rotary slide, presses the toothed rack with its opposing teeth into the spaces between the teeth of the toothed strip, and wherein the joint is adapted for connection to vacuum cleaner suction tubes and tripods with an orientation in which gravity will move the catch element in a direction away from the rotary slide recess.

2. The telescopic tube joint according to claim 1, wherein the teeth in the toothed strip and the toothed rack are of the same size.

3. The telescopic tube joint according to claim 1, wherein the teeth in the toothed strip and the toothed rack have straight toothing.

4. The telescopic tube joint according to claim 1, wherein the teeth are provided with even profiles that run at an angle ($\alpha$) of between 30° and 90° to a horizontal.

5. The telescopic tube joint according to claim 1, wherein the tooth profiles are connected to one another via a radial rounding or an even flattening.

6. The telescopic tube joint according to claim 1, wherein the teeth are convexly rounded on their free ends over the width (B) of the toothed rack and the bases of the teeth in the toothed strip are concavely rounded over their width (B).

7. The telescopic tube joint according to claim 1, wherein a guiding sleeve is arranged between the inner peripheral surface of the respective outer tube and the outer peripheral surface of the respective inner tube.

8. The telescopic tube joint according to claim 1, wherein each rotary slide includes a clipped-on front ring on the expanded end area.

9. The telescopic tube joint according to claim 1, wherein all tubes are made of aluminum and the rotary slide, the guiding sleeve and the front ring as well as the toothed rack are made of a plastic material.

10. The telescopic tube joint according to claim 1, wherein the tubes have a wall thickness of 0.8 mm and an outer diameter (D) of 32 mm to 38mm.

11. The telescopic tube joint according to claim 1, wherein said at least one inner tube comprises first and second inner tubes, wherein a second rotary slide is arranged on the first inner tube which interacts with the second inner tube sliding in the first inner tube via a second toothed strip and a second toothed rack.

12. The telescopic tube joint according to claim 11, wherein the first and the second rotary slide have a cylindrical outer peripheral form.

* * * * *